(12) United States Patent
Hiramatsu et al.

(10) Patent No.: US 7,373,465 B2
(45) Date of Patent: May 13, 2008

(54) DATA PROCESSING SYSTEM CONFIGURING AND TRANSMITTING ACCESS REQUEST FRAMES WITH A FIELD IN CHANNEL COMMAND WORDS TO ACCOMMENDATE A PLURALITY OF LOGICAL DEVICE ADDRESS DATA THEREIN

(75) Inventors: Shinichi Hiramatsu, Odawara (JP); Isamu Kurokawa, Odawara (JP); Hisaharu Takeuchi, Odawara (JP); Jyunichi Muto, Odawara (JP); Miyuki Yasuda, Odawara (JP)

(73) Assignee: Hitachi, Ltd., Tokyo (JP)

( * ) Notice: Subject to any disclaimer, the term of this patent is extended or adjusted under 35 U.S.C. 154(b) by 263 days.

(21) Appl. No.: 11/268,525

(22) Filed: Nov. 8, 2005

(65) Prior Publication Data
US 2007/0061463 A1 Mar. 15, 2007

(30) Foreign Application Priority Data
Aug. 25, 2005 (JP) .............................. 2005-244043

(51) Int. Cl.
*G06F 13/00* (2006.01)
(52) U.S. Cl. ...................................... 711/154; 711/168
(58) Field of Classification Search ................ 711/154, 711/168
See application file for complete search history.

(56) References Cited

U.S. PATENT DOCUMENTS 5,530,897 A 6/1996 Meritt ........................ 395/829
2002/0069306 A1* 6/2002 Vishlitzky et al. ............. 710/5
2002/0069307 A1* 6/2002 Fairchild et al. ............... 710/5
2003/0061407 A1 3/2003 Kurokawa et al. ............. 710/5

FOREIGN PATENT DOCUMENTS

JP 2001-312454 4/2000
JP 2004-272349 3/2003

* cited by examiner

*Primary Examiner*—Reba I. Elmore
(74) *Attorney, Agent, or Firm*—Reed Smith LLP; Stanley P. Fisher, Esq.; Juan Carlos A. Marquez, Esq.

(57) ABSTRACT

In a data processing system in which a host processing apparatus and a storage subsystem are connected via a channel interface, the present invention makes it possible to expand the number of logical device addresses in excess of the device address limitations of the channel interface, and also enhances the performance of parallel access processing for the same logical device. When an access request is generated for a logical device, the host processing apparatus stores the logical device address to be accessed in a prefix command of a channel command word (CCW) for the access request, sets this CCW in a device information block of a frame which complies with the channel interface, sets a parallel access identifier for identifying a plurality of accesses for the same device in a device address of this frame, and then sends this frame to the storage subsystem.

11 Claims, 6 Drawing Sheets

DATA PROCESSING SYSTEM CONFIGURING AND TRANSMITTING ACCESS REQUEST FRAMES WITH A FIELD IN CHANNEL COMMAND WORDS TO ACCOMMENDATE A PLURALITY OF LOGICAL DEVICE ADDRESS DATA THEREIN

CROSS-REFERENCE TO RELATED APPLICATIONS

This application relates to and claims priority from Japanese Patent Application No. 2005-244043 filed on Aug. 25, 2005, the entire disclosure of which is incorporated herein by reference.

BACKGROUND OF THE INVENTION

1. Field of the Invention

The present invention relates to a data processing system, comprising a host processing apparatus, and a storage subsystem connected thereto for storing and managing data sent from the host processing apparatus.

2. Description of the Related Art

In a data processing system having a constitution such that a host processing apparatus of a mainframe system and a disk array device or other such storage subsystem are connected together so as to be able to communicate with one another via a channel interface, the host processing apparatus, in order to process an access request for the storage subsystem, creates a chain of a plurality of channel command words (hereinafter abbreviated as CCW) comprising a command code, command parameter, and data, and sends this chain of a plurality of CCW (hereinafter referred to as a CCW chain) to the storage subsystem. Describing the CCW chain yet further, when data is transferred to the storage subsystem from the host processing apparatus, as disclosed in the "IBM 3390/9390 Storage Control Reference," a WRITE system command is generally chained to DX (Define Extent) and LOC (LOCate Record). For example, when a single record is written to the storage subsystem, the host processing apparatus creates and sends a CCW chain in which a plurality of CCW, such as DX, LOC and WRCKD (Write, Count, Key and Data), are chained together in this order. Further, the above-mentioned DX and other commands, which precede READ and WRITE system commands, are called prefix commands.

A protocol that is widely used around the world exists as the protocol for the channel interface between the host processing apparatus and storage subsystem for a mainframe data processing system. The transmission of a CCW chain between the host processing apparatus and storage subsystem is carried out using a frame of a structure stipulated by this widely used protocol. This frame comprises a field, called an information field, this information field comprises a device header and a device information block, and the contents of the CCW (command, command parameter, and data) are set in the device information block. Further, the above-mentioned device header has a two-byte device address field, and the most-significant-byte area therein is a reserve area, and the least-significant-byte area can be used for specifying a device address.

Technology for carrying out parallel processing of a plurality of access requests directed at the same logical device inside the storage subsystem in a mainframe data processing system such as this, for example, is disclosed in Japanese Laid-open Patent No. 2001-312454.

According to the disclosure in Japanese Laid-open Patent No. 2001-312454, when a host processing apparatus generates a plurality of access requests to the same logical device, it creates a plurality of control blocks corresponding to these plurality of access requests, respectively, and then assigns different parallel access identification information to each of these plurality of control blocks. In addition, the host processing apparatus sets the address of the logical device to be accessed in the least-significant byte of the device address on the respective access request frames sent to the storage subsystem, and in the most-significant-byte reserve area sets parallel access identification information corresponding to the respective access requests. The storage subsystem, using the parallel access identification information set in the device address of the respective received access request frames, identifies a plurality of access requests for the same logical device, and in this way, parallelly processes the plurality of access requests for the same logical device.

Generally speaking, the storage subsystem manages a plurality of logical device addresses together in units called control units (hereinafter referred to as CU). As explained hereinabove, a widely used global protocol exists as the protocol for the channel interface for a mainframe data processing system, and by simply adhering to this protocol, the address of an access-targeted logical device inside the storage subsystem is set in the least-significant-byte area of the device address on an access request frame sent to the storage system from the host processing apparatus. Thus, a logical device address capable of being managed by one CU is limited to 1 byte, and accordingly, the maximum number of logical devices capable of being managed by a single CU is limited to 256.

SUMMARY OF THE INVENTION

An object of the present invention is to make it possible to exceed the device address limits on a channel interface and expand the number of logical device addresses in a data processing system in which a host processing apparatus is communicatively connected to a storage subsystem via a channel interface.

Another object of the present invention is to improve parallel processing performance of multiple access requests directed at the same logical device inside a storage subsystem in a data processing system in which a host processing apparatus is communicatively connected to a storage subsystem via a channel interface.

In accordance with the principle of the present invention, logical device identification information is transmitted by being set in a location in a frame, which is not controlled by the specifications of the channel interface between a host processing apparatus and a storage subsystem. Accordingly, this makes it possible to exceed the device address limits of the channel interface by expanding the amount of logical device identification information.

According to one aspect of the present invention, in a data processing system comprising a host processing apparatus and a storage subsystem which is communicatively connected to the host processing apparatus and has a plurality of logical devices for storing data, the host processing apparatus has a channel unit for notifying the storage subsystem of an access request for the respective logical devices, and the storage subsystem has a control processor for controlling access processing for the respective logical devices requested by the access request, in response to the access request notified from the host processing apparatus.

The channel unit of the host processing apparatus is constituted such that, when an access request is generated for a certain logical device, the channel unit creates one or more channel command words corresponding to the access request, sets logical device identification information for identifying the certain logical device in a first field inside at least one of the channel command words, creates one or more frames of the prescribed structure, sets the channel command words in a second field inside the frame, and sends the frame to the storage subsystem.

Further, the control processor of the storage subsystem is constituted such that it receives the frame sent from the host processor apparatus, receives the channel command word from the second field of the received frame, acquires the logical device identification information from the first field inside at least one of the received channel command word, specifies which logical device is being targeted for access based on the acquired logical device identification information, and controls access processing for the access-targeted logical device in accordance with the received channel command word.

According to this data processing system, when an access request is generated for a certain logical device inside a storage subsystem in a host processing apparatus, logical device identification information for specifying the access-targeted logical device is incorporated inside a channel command word (hereinafter referred to as CCW) of the access request, and sent to the storage subsystem. Communication between the host processing apparatus and storage subsystem must be carried out in accordance with the specifications of the channel interface between the two by setting the communication contents in a frame of a prescribed structure, and transmitting and receiving this frame, and the CCW is incorporated inside one or more frames and transmitted. However, the CCW incorporated inside a frame is perceived simply as data by the channel interface, and the structure and size of the CCW is not restricted by the specifications of the channel interface. Therefore, the size of the logical device identification information incorporated into a CCW is also not restricted by the specifications of the channel interface. Consequently, the amount of logical device identification information capable of being managed can be increased without being limited by the specifications of the channel interface.

In a preferred embodiment of a data processing system according to the present invention, when a plurality of access requests are generated for the certain logical device, the channel unit of the host processing apparatus allocates different parallel access identification information to each of the plurality of access requests, and then sets the different parallel access identification information allocated to each of the plurality of access requests in a third field of the frames for these access requests, and sends these frames to the storage subsystem. Further, the control processor of the storage subsystem acquires the parallel access identification information from the third fields of the received frames, and identifies each of the plurality of access requests directed at the same logical device in accordance with the acquired parallel access identification information.

Thus, by utilizing parallel access identification information it is possible to parallelly process a plurality of access requests generated for the same logical device. The maximum number of access requests capable of being parallelly processed is determined by the size of the parallel access identification information, and is not dependent on the number of logical devices implemented in the storage subsystem.

Further, in the preferred embodiment, parallel access identification information is set in a device address field inside a frame, and logical device identification information is set in a prescribed field inside a command parameter in a CCW of a prefix command, but the size of the latter field is far larger than that of the former field. Accordingly, far more logical devices can be managed than with conventional technology, whereby logical device identification information is set in the former field.

Further, in the preferred embodiment, the control processor of the storage subsystem is adapted to create a response frame of a prescribed structure for responding to the access request from the host processing apparatus, set parallel access identification information allocated to each of the access requests and logical device identification information of the access-targeted logical device in the response frame, and then return the response frame to the host processing apparatus. The method for setting parallel access identification information and logical device identification information inside a response frame is the same as that of the access request frame sent from the host processing apparatus described hereinabove.

Further, in the preferred embodiment, the host processing apparatus is constituted so as to further comprise a number of control blocks to which can be allocated processing operations of different access requests, respectively, and, when a plurality of access requests are generated for the certain logical device, the channel unit of the host processing apparatus allocates different control blocks to the plurality of access requests, and then parallelly controls the processing operations of the plurality of access requests using the different control blocks and the different parallel access identification information, which is allocated to each of the plurality of access requests.

The channel unit of the host processing apparatus has a plurality of subchannels for respectively storing control information, each of which is utilized in creating the frames for each access request, and is constituted so as to identify, from among the plurality of subchannels, a free subchannel that is currently not being used, and to dynamically allocate the respective free subchannels to the respective access requests when each access request is generated.

Further, in the preferred embodiment, the storage subsystem is adapted to generate a plurality of access control blocks respectively allocated to a plurality of access processes for the same logical device on the basis of the combination of the logical device identification information acquired from the received channel command word and the parallel access identification information acquired from the received frame, and parallelly controlling the plurality of access processes using the plurality of access control blocks.

According to another aspect of the present invention, a host processing apparatus in the above-described data processing system is provided.

According to yet another aspect of the present invention, a storage subsystem in the above-described data processing system is provided.

According to yet another aspect of the present invention, in a data processing system comprising a host processing apparatus, and a storage subsystem communicatively connected to the host processing apparatus, as a method for processing access requests for a plurality of logical devices inside the storage subsystem, there is provided an access request processing method, which, A. in the host processing apparatus, has the steps of:

creating, when an access request is generated for a certain logical device, one or more channel command words corresponding to the access request;

setting in a first field inside at least one of the channel command words logical device identification information for identifying the certain logical device;

creating one or more frames of the prescribed structure, and setting the channel command word in a second field inside the frame; and sending the frame to the storage subsystem, and B. in the storage subsystem, has the steps of:

receiving the frame sent from the host processing apparatus;

receiving the channel command word from the second field of the received frame;

acquiring the logical device identification information from the first field inside at least one of the received channel command words;

specifying which logical device is targeted for access based on the acquired logical device identification information; and controlling access processing for the access-targeted logical device in accordance with the received channel command words.

DESCRIPTION OF THE PREFERRED EMBODIMENTS

The embodiments of the present invention will be explained in detail below while referring to the figures.

Figure 1:
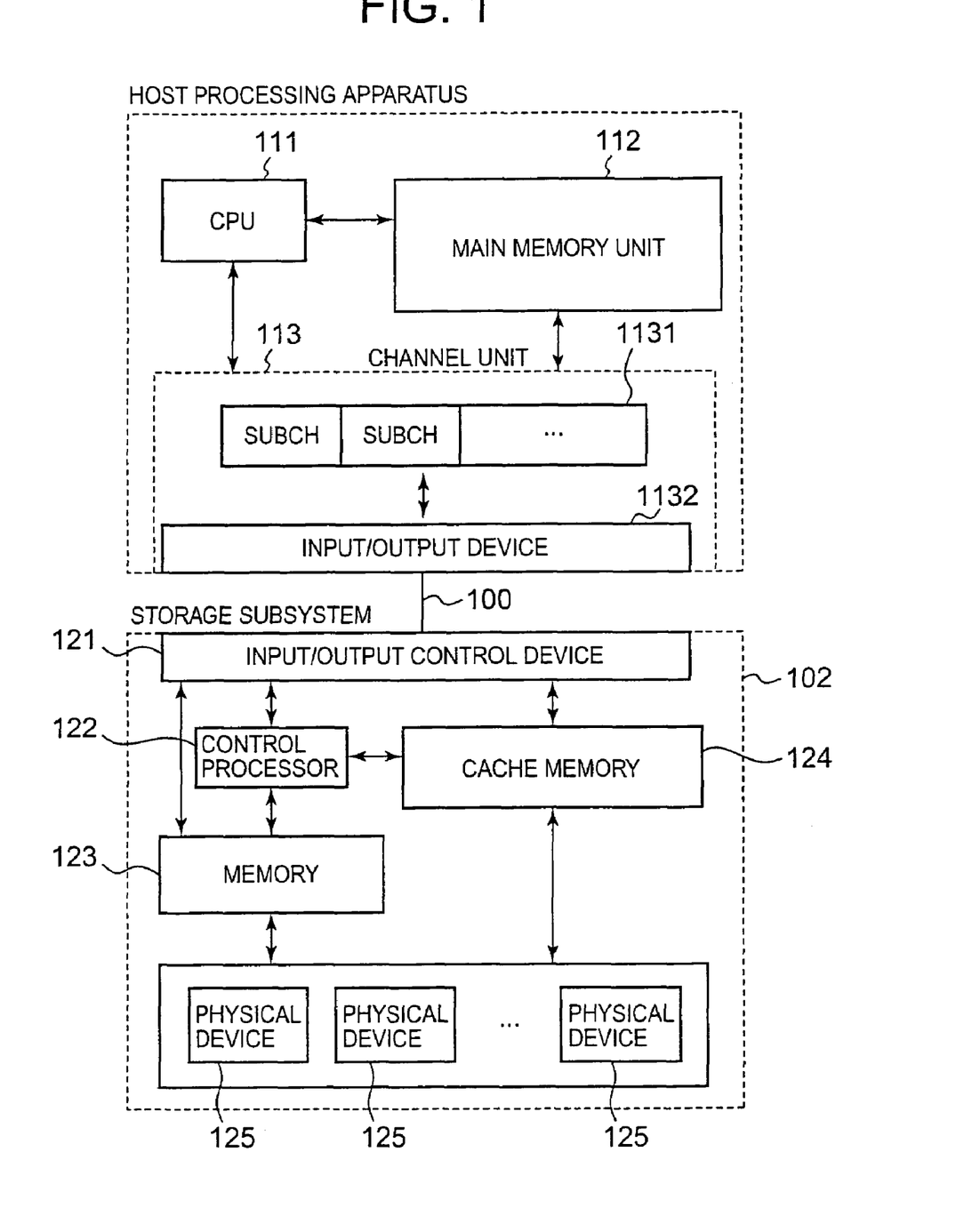
FIG. 1 is a block diagram showing the overall constitution of a data processing system related to a first embodiment of the present invention.

FIG. 1 shows the overall constitution of a mainframe data processing system related to a first embodiment of the present invention.

As shown in FIG. 1, a data processing system related to this first embodiment comprises a host processing apparatus 101; a storage subsystem 102; and a cable 100 for communicatively connecting the host processing apparatus 101 and the storage subsystem 102. In this data processing system, new technology, which accords with the principle of the present invention, is employed in the respective aspects of processing an access request inside the host processing apparatus 101; transmitting an access request from the host processing apparatus 101 to the storage subsystem 102; and processing an access request inside the storage subsystem 102. As a result of this, it is possible to enhance parallel processing performance for a plurality of access requests directed at the same logical device to beyond that possible with conventional technology, and to exceed the device address number limitations of the channel interface between the host processing apparatus 101 and the storage subsystem 102 so as to increase the number of logical device addresses capable of being managed. The constitution of this data processing system will be explained in detail hereinbelow.

The host processing apparatus 101 is typically a computer of a mainframe system, but this is nothing more than an example for explanation purposes, and other types of computers are also acceptable. The host processing apparatus 101 has a CPU 111 for running an operating system and executing user programs and other such computer programs; a main memory unit 112 for storing these computer programs, plus various control data and the like; and a channel unit 113 for controlling data transmission between the main memory unit 112 and the storage subsystem 102. The channel unit 113 has a plurality of subchannels (hereinafter referred to as SUBCH) 1131 for storing the various control information required for data transmission and access request processing; and an input/output device 1132 for creating a frame in accordance with a prescribed channel interface protocol based on the information stored in the SUBCH 1131, sending this frame to the storage subsystem 102, and receiving a frame from the storage subsystem 102. By storing the control information required for processing an access request (the logical device address targeted for access; a parallel access identifier, which will be explained below; and the address inside the main memory unit 112 of a CCW corresponding to an access request, etc.) in a certain SUBCH 1131, a frame for notifying the storage subsystem 102 of this access request is created, and transmitted to the storage subsystem 102.

The storage subsystem 102 comprises an input/output controller 121 for transmitting a frame to the channel unit 113 of the host processing apparatus 101 using the above-mentioned channel interface; a control processor 122 for managing data stored inside the storage subsystem 102 and controlling access processing; a memory 123 for storing control information for controlling access processing, and control information for managing data; a cache memory 124 for speeding up the reading and writing of data; and a plurality of physical devices (for example, hard disk drives) 125 for storing data.

The control processor 122 manages the storage area provided by the plurality of physical devices 125 by dividing this area into a number of logical devices (what are called volumes). In addition, the control processor 122 also manages the number of logical devices by dividing them into a plurality of groups called control units (hereinafter referred to as CU). A unique CU identifier is allocated to each CU, and a unique logical device address on the inside of each CU is allocated to each logical device.

When the host processing apparatus 101 sends an access request for a certain logical device to the storage subsystem 102, it specifies the logical device address of the access-targeted logical device, and the CU identifier of the CU for this logical device. Here, as will be explained in more detail below, the address of the access-targeted logical device specified by the host processing apparatus 101 is not set in the device address field in the frame of the channel interface between the host processing apparatus 101 and the storage subsystem 102 as with conventional techniques, but rather, is set inside a CCW corresponding to the access request set in this frame. (For example, in the case of READ and WRITE system access requests, it can be set inside the command parameter of a prefix command.) Further, instead of the access-targeted logical device address, identification information for identifying a plurality of access requests to be parallelly processed for the same logical device (hereinafter, referred to as a parallel access identifier) is set in the device address field in this frame. As a result of this, the number of logical devices belonging to a single CU can exceed the maximum number of device addresses (for example, 256 addresses) capable of being set in the device address of this frame. Further, it also becomes possible to parallelly process a plurality of access requests for the same logical device.

Next, the configuration of control information for parallelly processing a plurality of access requests, which the host processing apparatus 101 generates inside the main memory unit 112 in a data processing system related to this embodiment will be explained.

Figure 2:
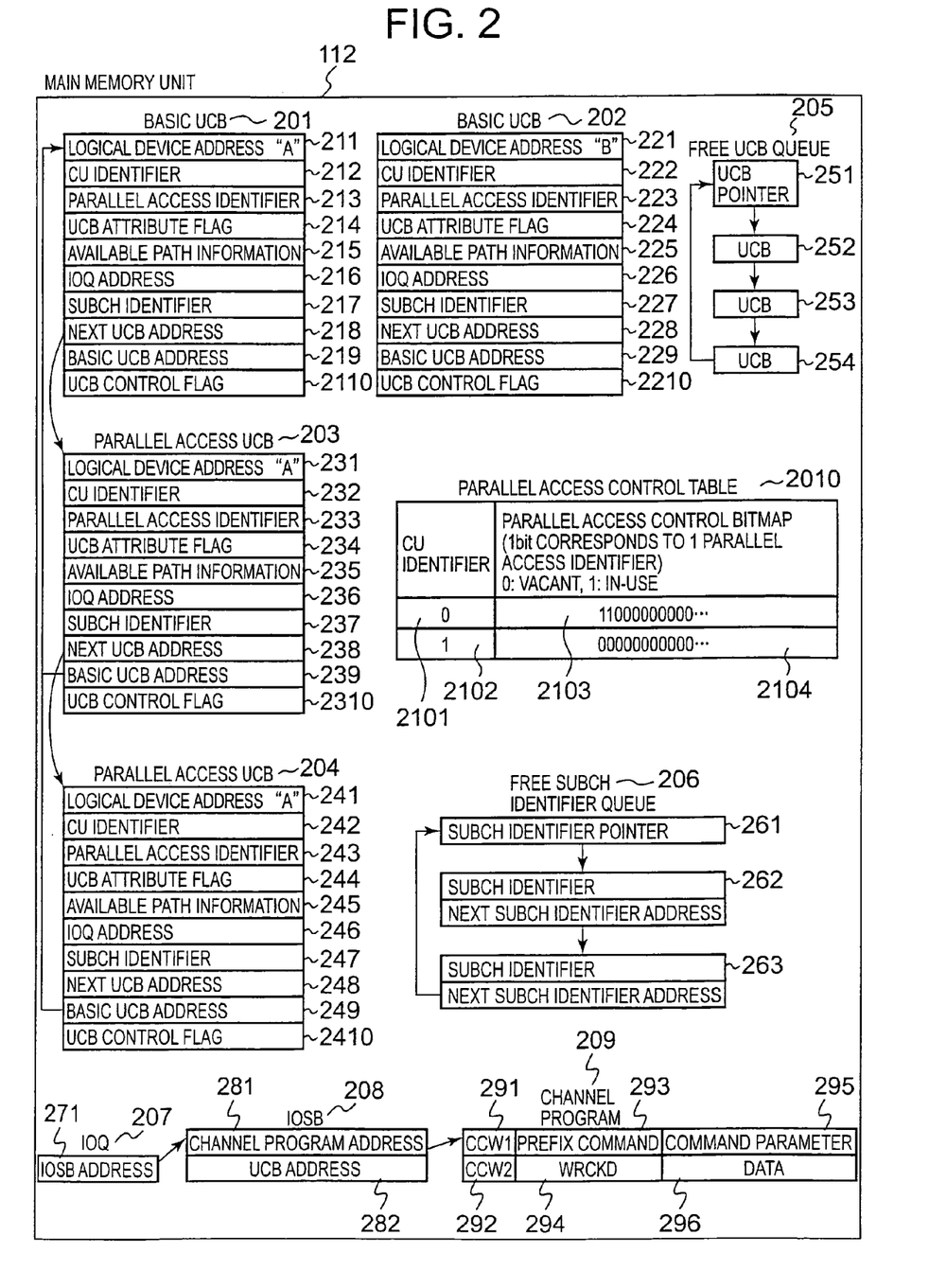
FIG. 2 is a block diagram showing an example of the configuration of control information for parallelly processing a plurality of access requests, which a host processing apparatus generates inside the main memory unit in a data processing system related to the first embodiment of the present invention.

FIG. 2 shows an example of the configuration of control information for parallelly processing a plurality of access requests that exist inside the main memory unit 112 of the host processing apparatus 101.

The point to be noted in the configuration of the control information shown in FIG. 2 is that, when a plurality of access requests are generated for the same logical device, a plurality of unit control blocks having different parallel access identifiers is allocated for these plurality of access requests, making it possible to parallelly process this plurality of access requests using this plurality of unit control blocks. This control information configuration will be explained in detail hereinbelow.

As shown in FIG. 2, a number of unit control blocks (hereinafter referred to as UCB) 201, 202, 203, 204, 252, 253, 254 exist inside the main memory unit 112. Each UCB is an aggregate of various kinds of control data, such as the logical device address, CU identifier, parallel access identifier, and UCB attribute flag required to process each access request directed to each logical device. As a rule, one UCB is allocated for one access request. Each UCB has any one of three types of attributes (or classifications) referred to as "basic", "parallel access", and "free" (hereinafter, the UCBs of these respective attributes will be called basic UCB, parallel access UCB and free UCB). The structure of all UCBs can be the same regardless of the attribute.

A basic UCB is the UCB, which is allocated in advance to each logical device implemented inside the storage subsystem 102. Actually, since it is normal for an extremely large number of logical devices to exist inside the storage subsystem 102, an extremely large number of basic UCB, which are respectively allocated to this extremely large number of logical devices, exist inside the main memory unit 112 of the host processing apparatus 101, but to simplify the explanation, only two basic UCBs 201, 202, which have been made to correspond to the two logical devices "A" and "B", respectively, are given as examples in FIG. 2. Each basic UCB can be allocated to one access request for each logical device allocated thereto.

When a plurality of access requests is generated for one logical device, a parallel access UCB is allocated to an access request of these plurality of access requests other than the one access request to which a basic UCB has been allocated. One parallel access UCB is allocated to one access request directed at a certain logical device, and is associated with the basic UCB allocated to another access request directed at this same logical device. In the example given in FIG. 2, two parallel access UCBs 203, 204 are associated with the basic UCB 201 allocated to logical device address "A". This signifies that there are currently three access requests for the logical device of logical device address "A", and that a basic UCB 201 has been allocated to the first access request, a first parallel access UCB 203 has been allocated to the second access request, and a second parallel access UCB 204 has been allocated to the third access request. By contrast, there are no parallel access UCBs associated with the basic UCB 202, which has been allocated to logical device address "B". This signifies that a plurality of access requests do not presently exist for the logical device of logical device address "B" (either only one access request exists, or there are no access requests).

Like the basic UCB 201 and parallel access UCBs 203, 204 shown in the figure, mutually different parallel access identifiers for identifying this plurality of access requests are allocated to a plurality of UCBs (one basic UCB and one or more parallel access UCBs), which are respectively allocated and mutually associated with a plurality of access requests for the same logical device. Then, a plurality of access requests can be parallelly processed by using the plurality of UCBs (one basic UCB and one or more parallel access UCBs) having different parallel access identifiers like this.

A free UCB is a UCB, which has yet to be allocated to any access request for any logical device. (In other words, it can be allocated to any logical device.) When a free UCB is allocated to a certain access request, its attribute changes and it transitions to the above-mentioned parallel access UCB, and when the processing of the access request to which it has been allocated is finished, it once again changes attributes and transitions back to a free UCB. Thus, a free UCB is the source of a parallel access UCB. Actually, since the number of access requests capable of being parallelly processed is numerous, a large number of free UCBs are provided inside the main memory unit 112. However, in order to simplify the explanation, only three free UCBs 252, 253, 254 are given as examples in FIG. 2.

As shown in FIG. 2, a plurality of free UCBs 252, 253, 254 is managed inside a free UCB queue 205. Inside the free UCB queue 205, the plurality of free UCBs 252, 253, 254 is serially associated in a queue structure from a UCB pointer 251, which points to the first free UCB 252 inside this queue 205. Although omitted from the figure, the structure of each free UCB is the same as that of a parallel access UCB, and the address of the next UCB inside each UCB (for example, reference number 218 inside basic UCB 201), which will be explained below, is used in the pointer for connecting a free UCB to the next free UCB in the queue structure.

When a new access request is generated for a prescribed certain logical device, if the basic UCB corresponding to this logical device has already been allocated to a different access request, one free UCB is extracted from inside the free UCB queue 205, this free UCB transitions to a parallel access UCB, and it is allocated to this new access request. When the processing of this new access request is finished, this parallel access UCB transitions back to a free UCB, and enters the free UCB queue 205 once again.

As shown in FIG. 2, a free SUBCH identifier queue 206 also exists in the main memory unit 112 of the host processing apparatus 101, and a SUBCH identifier for identifying, from the plurality of SUBCH (subchannels) 1131 shown in FIG. 1, a free SUBCH, which has yet to be allocated to any access request process, is managed therein. In the example of FIG. 2, there are two SUBCH identifiers 262, 263 inside the free SUBCH identifier queue 206, and this signifies that two SUBCHs corresponding to these two SUBCH identifiers 262, 263 are currently free.

Inside the free SUBCH identifier queue 206, the SUBCH identifiers 262, 263 are serially associated in a queue structure from a SUBCH identifier pointer 261, which indicates the first SUBCH identifier 262 inside this queue 206. When a new access request is generated, as explained hereinabove, a certain UCB is allocated to this new access request, one SUBCH identifier is extracted from inside the free SUBCH identifier queue 206 at this time, and this SUBCH identifier is registered in this UCB. In accordance therewith, one SUBCH, which is specified by this SUBCH identifier, is secured for processing this new access request.

As shown in FIG. 2, an input/output queue (hereinafter referred to as IOQ) 207 for managing the processing of the respective access requests, an input/output service block (hereinafter referred to as IOSB) 208, which is associated with the IOQ 207, and a channel program 209, which is associated with the IOSB 208 also exist in the main memory unit 112 of the host processing apparatus 101. In fact, since IOQ are allocated for all access requests that currently exist on a one-to-one basis, a large number of IOQs exist inside the main memory unit 112, but in order to simplify the explanation, only one IOQ 207 is given as an example in FIG. 2.

As shown in FIG. 2, the IOQ 207 has an IOSB address 271 for indicating the IOSB 208 associated therewith. The IOSB address 271 inside the IOQ 207 is set at the point in time when an available UCB is allocated to the IOQ 207. The IOSB 208 is a data block utilized for transferring a channel program 209 and UCB required for processing an access request to a subchannel 1131 (see FIG. 1). The IOSB 208 has a channel program address 281, which indicates the channel program 209 associated therewith, and a UCB address 282, which indicates the UCB associated therewith. The channel program 209 has a chain of CCWs (channel command words) 291, 292 for achieving access processing. In FIG. 2, a chain of CCWs 291, 292 corresponding to READ (read) and WRITE (write) system access requests is given as an example, and the first CCW 291 comprises a command code 293 and a command parameter 295 of a prefix command, and the second CCW 292 comprises the command code of the requested access operation ("WRCKD", the example given in the figure, is a WRITE system command code) 294 and the operation-targeted data 296.

As shown in FIG. 2, a parallel access control table 2010 for managing the utilization state of a parallel access identifier for each CU inside the storage subsystem 102 exists in the main memory unit 112 of the host processing apparatus 101. The parallel access control table 2010 has a CU identifier and a parallel access control bitmap for each CU. In fact, because a large number of CUs exist inside the storage subsystem 102, a large number of sets of CU identifiers and parallel access control bitmaps, which are respectively allocated to this large number of CUs, exists inside the parallel access control table 2010, but in order to simplify the explanation, only two sets of CU identifiers 2101, 2102 and parallel access control bitmaps 2103, 2104, which are allocated to two CUs, are shown in FIG. 2. The CU identifiers specify the CUs. Each parallel access control bitmap allocated to a CU has a bitmap of N bits for showing the utilization state of N parallel access identifiers capable of being issued in relation to the respective CUs, and each bit corresponds to a parallel access identifier. In this embodiment, N=256, and this number of "256", as will be explained in detail below, corresponds to the number of device addresses (one byte) capable of being set in the device address field of a frame of the channel interface between the host processing apparatus 101 and the storage subsystem 102. Therefore, in this embodiment, a maximum of 256 parallel access identifiers ranging from a value of "0" to a value of "255" can be issued for a single CU, and this signifies that a maximum of 256 access processes can be parallelly processed for a single CU.

The value "1" (ON state) of the respective bits inside each parallel access control bitmap signifies that the parallel access identifier corresponding to that bit is currently in-use, and the value "0" (OFF state) signifies that it is currently vacant. When a new access request is generated for a certain logical device in the host processing apparatus 101, a parallel access identifier is allocated to this access request as follows using the parallel access control table 2010. That is, the parallel access control bitmap 2103 corresponding to the CU identifier (for example, "0") 2101 of the CU to which the access-targeted logical device belongs is referenced, and a bit indicating vacant (value "0") is searched for in order from the lead bit. The example shown in FIG. 2 shows that the lead and second bits are both in-use (value "1"), and that the third bit is vacant (value "0"). This signifies that the number "0" and number "1" parallel access identifiers corresponding to the lead and second bits, respectively, are in-use, and the number "2" parallel access identifier corresponding to the third bit is vacant. Accordingly, the unused parallel access identifier "2" is allocated to this access request (it is written to the UCB allocated to this access request), and the third bit inside the parallel access control bitmap 2103 is simultaneously changed to in-use (value "1"). Thereafter, when the processing of this access request is finished, this third bit returns to vacant (value "0") once again.

The structure of the respective UCBs will be explained in more detail by referring to FIG. 2. As explained hereinabove, UCBs of any of the attributes can be structurally the same. Accordingly, this structure will be explained using the basic UCB 201 in FIG. 2 as a representative example.

The UCB 201 has a logical device address 211, a CU identifier 212, a parallel access identifier 213, a UCB attribute flag 214, available path information 215, an IOQ address 216, a SUBCH identifier 217, a next UCB address 218, a basic UCB address 219, and a UCB control flag 2110. The logical device address 211 here is a logical device address of one logical device allocated to this UCB 201. The CU identifier 212 is the CU identifier of the CU of the logical device allocated to this UCB. The parallel access identifier 213 is one of the parallel access identifiers allocated to this UCB 201, and is allocated via the above-mentioned method based on the parallel access control table 2010. The UCB attribute flag 214 indicates the attribute (classification) of this UCB 201, that is, it shows whether it is a basic UCB, a parallel access UCB or a free UCB. Available path information 215 is information about a path capable of being utilized in access processing. The IOQ address 216 is the address of the IOQ 207, which is allocated to an access request allocated to this UCB 201. The SUBCH identifier 217 is the address of the SUBCH, which is used in the processing of an access request allocated to this UCB 201, and as explained hereinabove, is extracted from the free SUBCH identifier queue 206. The next UCB address 218 is the address of the subsequent parallel access UCB 203, which is allocated to another access request directed at the same logical device, and is linked to this parallel access UCB 203. The basic UCB address 219 is the address of the basic UCB 201 allocated to a certain access request for the same logical device, and is linked to this basic UCB 201. The UCB control flag 2110 is the flag for controlling whether or not this UCB 201 is in-use or not (whether or not it has been allocated to a specific access request).

Next, the configuration of control information for parallelly processing a plurality of access requests, which the storage subsystem 102 generated inside the memory 123, and which were received from the host processing apparatus 101 in a data processing system related to this embodiment, will be explained.

Figure 3:
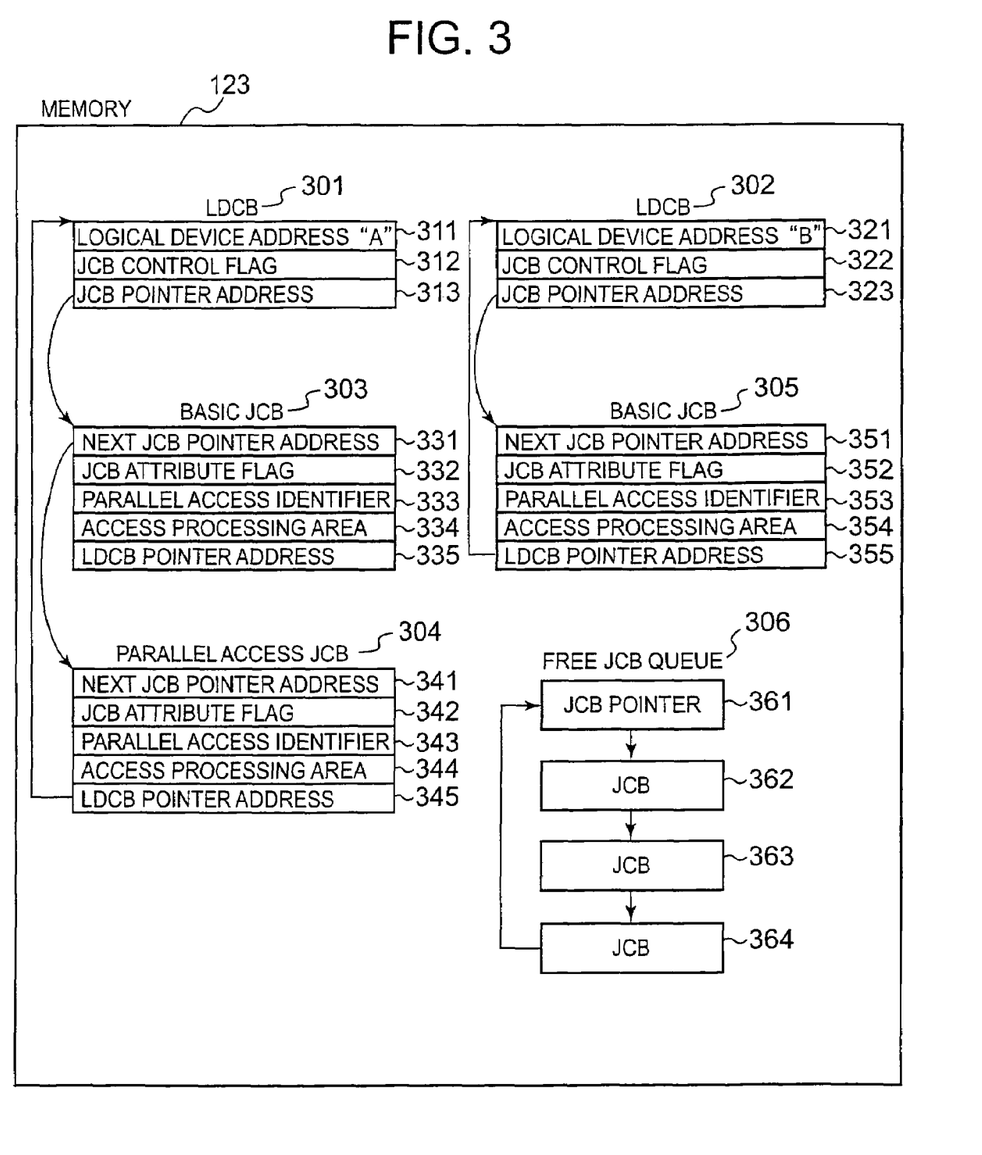
FIG. 3 is a block diagram showing an example of the configuration of control information for parallelly processing a plurality of access requests, which a storage subsystem generates inside memory in a data processing system related to the first embodiment of the present invention.

FIG. 3 shows an example of the configuration of control information for parallelly processing a plurality of access requests, which exist inside the memory 123 of the storage subsystem 102.

As shown in FIG. 3, a number of logical device control blocks (hereinafter, referred to as LDCB) 301, 302 for respectively managing the logical device address and configuration information of a logical device exist inside the memory 123 of the storage subsystem 102. In fact, there exists a large number of LDCBs, which are respectively allocated to a large number of logical devices implemented in the storage subsystem 102, but in order to simplify the explanation, only two LDCBs 301, 302, which are allocated to two logical devices, are shown in FIG. 3.

Further, a large number of job control blocks (hereinafter referred to as JCB) 303, 304, 305, 362, 363, 364 for managing the respective access processing exist in the memory 123. Similar to the above-mentioned UCB inside the host processing apparatus 101, each JCB has one of three attributes (classifications), "basic", "parallel access", and "free" (hereinafter, the JCB of the respective attributes will be referred to as basic JCB, parallel access JCB and free JCB). All the JCB can be the same structurally regardless of the attribute.

Basic JCBs are allocated on a one-to-one basis to the respective logical devices, and are associated to an LDCB allocated to the same logical device, and can be allocated to one access request for each logical device. Actually, there are a large number of basic JCBs respectively allocated to a large number of logical devices, which are implemented in the storage subsystem 102, but only two basic JCBs 303, 305, which are respectively allocated to two logical devices of logical device addresses "A" and "B", are given as examples in FIG. 3.

When a plurality of access requests is received for the same logical device, a parallel access JCB is allocated to an access request other than the one access request, of this plurality of access requests, which is allocated to the basic JCB. Each parallel access JCB is associated to the basic JCB allocated to the same logical device. The number of parallel access JCB increases or decreases in accordance with increases and decreases in the number of access requests for each logical device, but only one parallel access JCB 304, which is allocated to the logical device of logical device address "A" is given as an example in FIG. 3.

A free JCB is a JCB, which is currently still not allocated to any access request for any logical device. (In other words, a JCB that can be allocated to any logical device.) In fact, a large number of free JCBs is provided, but only three free JCBs 362, 363, 364 are given as examples in FIG. 3. Free JCBs 362, 363, 364 are managed inside a free JCB queue 306. In the free JCB queue 306, the free JCBs 362, 363, 364 are serially associated in a queue structure from a JCB pointer 361, which indicates the first free JCB 362 inside this queue 306. The free JCB queue 306 is the supply source of a parallel access JCB. That is, when one access request is received for a certain logical device, if the basic JCB, which is allocated to this logical device, has already been allocated to the processing of another access request, one free JCB is extracted from the free JCB queue 306, this free JCB is converted to a parallel access JCB, and allocated to the processing of this received access request. Thereafter, when this access request processing is finished, this parallel access JCB is converted to a free JCB, and is placed in the free JCB queue 306 once again.

The structures of the respective LDCBs and JCBs will be explained below taking the LDCB 301 and basic JCB 303 in FIG. 3 as typical examples.

The LDCB 301 has a logical device address 311, a JCB control flag 312, and a JCB pointer address 313. The logical device address 311 shows the address of the logical device to which this LDCB 301 is allocated. The JCB control flag 312 is the flag for controlling the state of a JCB associated to this LDCB 301. The JCB pointer address 313 is the address of the basic JCB 303 allocated to the same device as this LDCB 301, and associates this basic JCB 303 to this LDCB 301. One basic JCB 303 is always associated to one LDCB 301.

The JCB 303 has a next JCB pointer address 331, a JCB attribute flag 332, a parallel access identifier 333, an access processing area 334, and an LDCB pointer address 335. The next JCB pointer address 331 shows the address of the parallel access JCB allocated to the same logical device as this JCB 303, and associates this parallel access JCB to this JCB 303. The JCB attribute flag 332 shows the attribute (classification) of this JCB 303, in other words, shows it is either a basic JCB, a parallel access JCB, or a free JCB. The parallel access identifier 333 shows the parallel access identifier, which is allocated to the access request allocated to this JCB 303. The access processing area 334 is a storage area for storing the contents of the received frame, which carried the access request allocated to this JCB 303 (that is, the contents of the received frame required for processing this access request). The LDCB pointer address 335 shows the address of the LDCB 301 allocated to the same logical device as this JCB 303, and associates this JCB 303 to this LDCB 301.

Next, a method for specifying a logical device address to be accessed, using a CCW chain for an access request generated by the host processing apparatus 101 in a data processing system related to this embodiment, will be explained.

Figure 4:
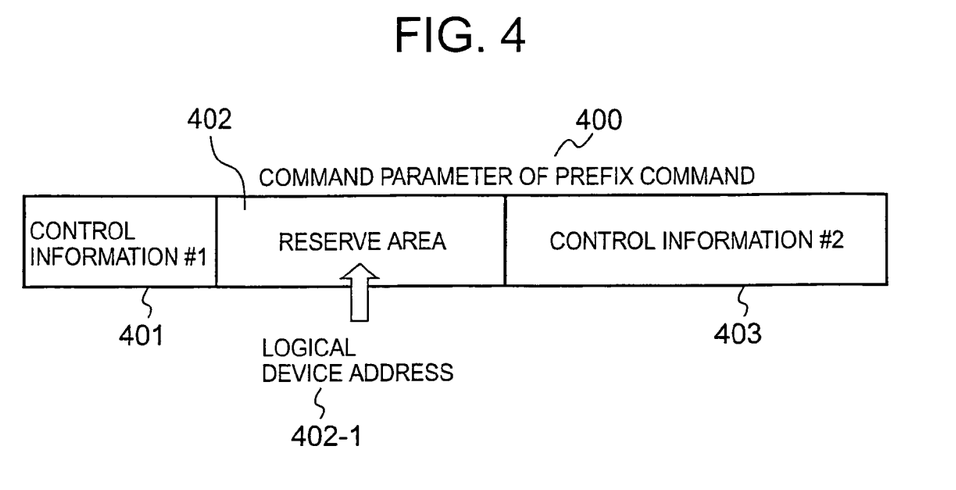
FIG. 4 is a diagram showing an example of a command parameter structure of a prefix command containing the initial CCW of a CCW chain for an access request generated by a host processing apparatus in a data processing system related to the first embodiment of the present invention.

FIG. 4 shows an example of a structure of a command parameter of a prefix command, which precedes a READ and WRITE system access operation command in a CCW chain for an access request (Reference number 295 in FIG. 2). FIG. 4 shows this structure by giving as an example the command parameter of the prefix command, which precedes a READ and WRITE system operation command.

As shown in FIG. 4, the command parameter 400 of this prefix command has a plurality of control information (control parameters) 401, 403 for controlling the prefix command, and a reserve area 402, which is not used in prefix command control. In this embodiment, a logical device address to be accessed 402-1 is set in the reserve area 402 of the command parameter 400. Here, the structure of the command parameter 400, for example, the size of the reserve area 402, can be determined at the discretion of the designers of the host processing apparatus 101 and storage subsystem 102, and is not restricted to the specifications of the channel interface between the host processing apparatus 101 and the storage subsystem 102. The size of the reserve area 402 can be larger than the size (one byte) of the device address 522a inside the frame 500 shown in FIG. 5, which will be explained below (a parallel access identifier, as will be explained below, is set here), and, for example, can be tens of bytes or larger, and thus, the logical device address capable of being specified using the reserve area 402 can be tens of bytes or larger. As a result, it is possible to manage a much larger number of logical devices than with conventional technology, wherein the logical device address is limited to one byte as a function of the specifications of the channel interface.

Next, the structure of a frame in a serial channel interface between the host processing apparatus 101 and the storage subsystem 102 in a data processing system related to this embodiment will be explained.

Figure 5:
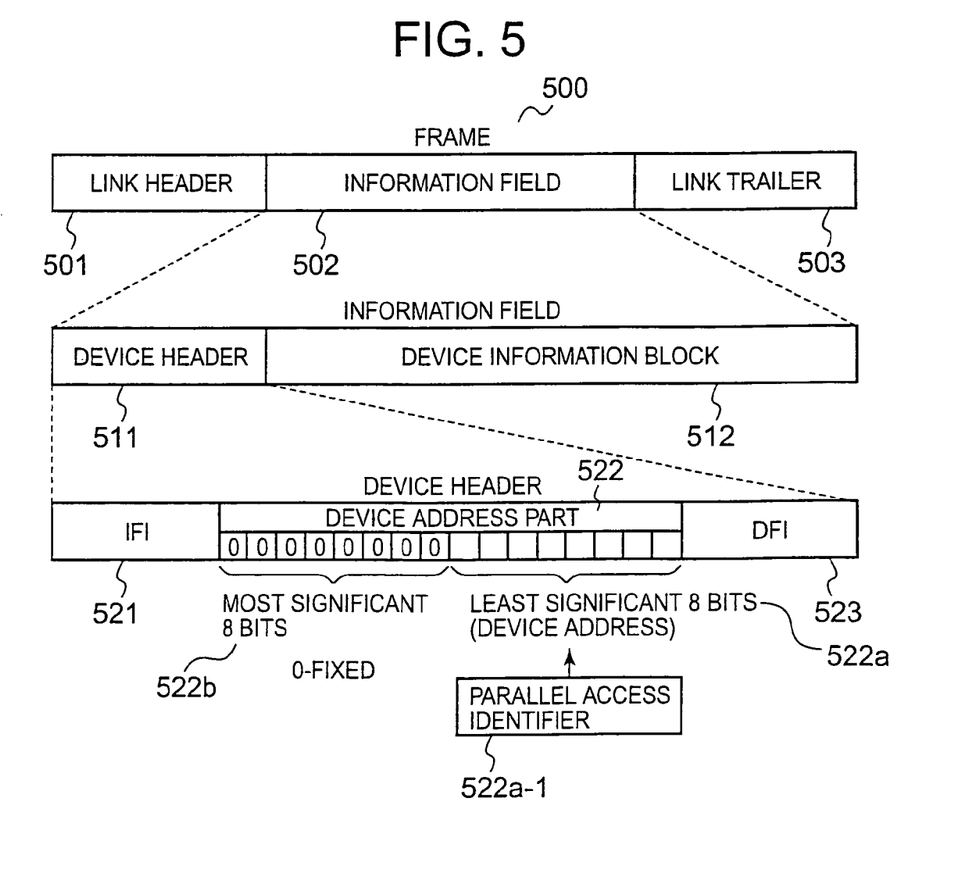
FIG. 5 is a diagram showing the structure of a frame in a serial channel interface between a host processing apparatus and a storage subsystem in a data processing system related to the first embodiment of the present invention.

FIG. 5 shows an example of a structure of a frame transmitted from the host processing apparatus 101 to the storage subsystem 102.

As shown in FIG. 5, a frame 500, which is transmitted in a serial channel interface between the host processing apparatus 101 and the storage subsystem 102, has three areas, that is, it has a link header 501, an information field 502, and a link trailer 503. The link header 501 comprises information, which indicates the beginning of the frame 500, and path information, which is utilized in transmission and reception, and the link trailer 503 comprises information, which indicates the end of the frame 500, and a redundancy check code. The information field 502 has a device header 511, and a device information block 512.

A CCW corresponding to an access request, and information related to this CCW, is set in the device information block 512 of the information field 502. Since a logical device address stored in the command parameter 400 of the prefix command shown in FIG. 4 is one part of the CCW of the prefix command, it is set and transmitted in the device information block 512 of the information field 502. As is well known, the channel interface protocol treats the CCW set in the device information block 512 of the information field 502 as simple data here, and the structure and size of the CCW itself is not limited. Therefore, as was explained by referring to FIG. 4, the number of logical device addresses capable of being specified using the command parameter 400 of a prefix command can be increased beyond the limits posed by the specifications of the channel interface.

Now then, as shown in FIG. 5, the device header 511 of the information field 502 has an information field identifier (hereinafter referred to as IFI) 521, a device address part 522, and a DHF field 523. A CU identifier and so forth of a CU of an access-targeted logical device is set in the IFI 521. The device address part 522, for example, is 16-bits (2-bytes) of information, and the most significant 8 bits (most significant byte) is the reserve area 522, and the least significant 8 bits (least significant byte) is the device address 522a. In accordance with the prior art, since the address of a logical device to be accessed is set in the one-byte device address 522a, the number of logical devices capable of being managed per CU is limited to the 256 capable of being specified in one byte. By contrast, in this embodiment, the logical device address, as was explained by referring to FIG. 4, is set inside the CCW itself without being limited to the specifications of the channel interface, and, in addition, a parallel access identifier 522a-1 allocated to each access request is set in the least-significant-byte device address 522a of the device address part 522. Therefore, the number of parallel access identifiers capable of being managed per CU is limited to the 256 capable of being set in one byte. As shown in FIG. 2, the host processing apparatus 101 utilizes a parallel access control bitmap table 2010, and exercises control such that a maximum of 256 parallel access identifiers can be issued per CU, and this limit of a maximum of 256 is the result of the fact that the device address 522a in which a parallel access identifier 522a-1 is set as shown in FIG. 5, is one byte. Furthermore, from a practical standpoint, most often the parallel access request inside one CU can be sufficiently covered by 256 parallel access identifiers per CU.

The constitution of a data processing system related to this embodiment has been explained hereinabove. Next, the control of access request processing in the host processing apparatus 101 and storage subsystem 102, respectively, in this data processing system will be explained. First, the control of access request processing carried out by the host processing apparatus 101 will be explained.

Figure 6:
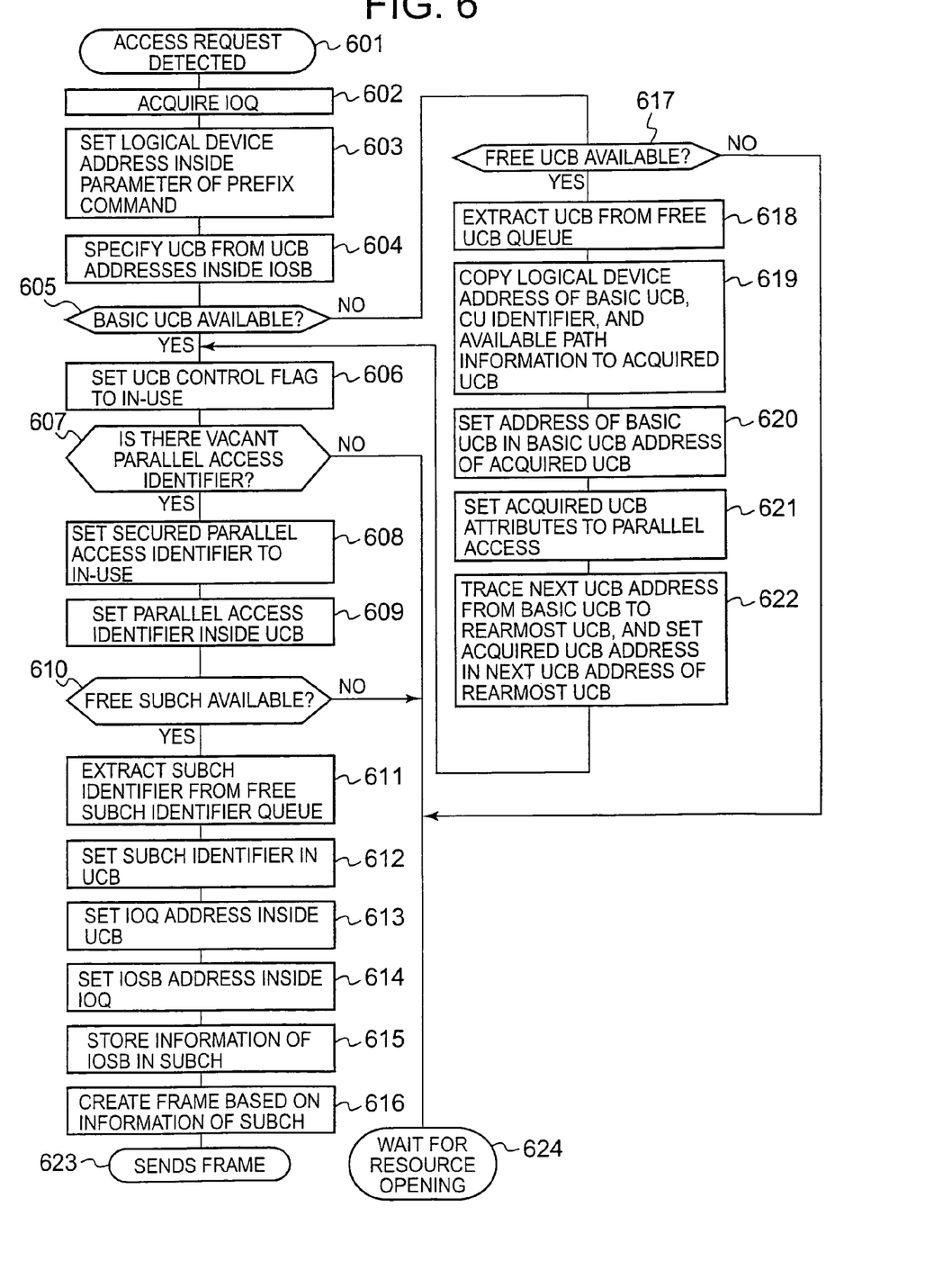
FIG. 6 is a flowchart showing one example of access request processing from access request generation to the transfer of a frame to a storage subsystem, which is executed by a host processing apparatus in a data processing system related to the first embodiment of the present invention.

FIG. 6 shows an example of the flow of access request processing executed by the host processing apparatus 101.

Referencing FIG. 2 and FIG. 6, when the channel unit 113 of the host processing apparatus 101, for example, detects an access request of a prefix command/WRCKD for a logical device having logical device address "A" (Step 601), it acquires one IOQ 207 (Step 602), and sets the logical device address "A" to be accessed in the command parameter 295 of the prefix command stored in the CCW 291 inside the channel program 209 indicated by the channel program address 281 inside the IOSB 208 corresponding to this access request (Step 603), and specifies the basic UCB 201 allocated to the access-targeted logical device from the UCB address 282 inside this IOSB 208 (Step 604).

The channel unit 113 determines whether or not the basic UCB 201 is in-use based on the UCB control flag 2110 inside the basic UCB 201 (Step 605), and if the basic UCB 201 is vacant, sets the UCB control flag 2110 inside the basic UCB 201 to in-use (Step 606). In addition, the channel unit 113 determines if there is a vacant parallel access identifier in the CU of the access-targeted logical device by referencing the parallel access control table 2010 (In other words, it searches for a "0" (vacant) bit from inside the parallel access control bitmap allocated to this CU.) (Step 607), and if there is a vacant parallel access identifier (if it finds a "0" bit), it sets this detected bit on the parallel access control table 2010 to "1" (in-use) and secures the parallel access identifier corresponding to this bit (Step 608), and sets this secured parallel access identifier in the parallel access identifier 213 inside the basic UCB 201 (Step 609).

In addition, the channel unit 113 searches out a SUBCH identifier from the free SUBCH queue 206 (Step 610), and if it detects a certain SUBCH identifier, for example, free SUBCH identifier 263, from the free SUBCH queue 206, it extracts this detected SUBCH identifier 263 from the free SUBCH identifier queue 206 (Step 611), and sets this acquired SUBCH identifier 263 in the SUBCH identifier 217 inside the basic UCB 201 (Step 612).

In addition, the channel unit 113 sets the address of the acquired IOQ 207 in the IOQ address 216 inside the basic UCB 201 (Step 613), sets the IOSB address 271 inside the IOQ 207 (Step 614), and sets the channel program address 281, which is inside the IOSB 208, the logical device address 211, which is inside the basic UCB 201, and the CU identifier 212, parallel access identifier 213, and available path information 215 in the SUBCH 1131 (see FIG. 1) specified by the SUBCH identifier 217 inside the basic UCB 201 (Step 615). Also, the channel unit 113, based on the above-mentioned information set inside the SUBCH 1131, creates a frame 500 (see FIG. 5), which incorporates the parallel access identifier 213 into the device address 522a (Step 616), and sends this frame 500 from the input/output device 1132 to the storage subsystem 102 (Step 623).

Meanwhile, when the basic UCB 201 cannot be used (when it is already being used in the processing of another access request) in Step 605, the channel unit 113 searches for a free UCB in the free UCB queue 205 (Step 617), and if it detects a free UCB in the free UCB queue 205, it extracts this detected free UCB from the free UCB queue 205 for use as a parallel access UCB 204 (Step 618), sets the same data as that of the logical device address 211, the CU identifier 212, and the available path information 215 inside the basic UCB 201, respectively, in the logical device address 241, the CU identifier 242, and the available path information 245, which are inside the acquired parallel access UCB 204 (Step 619), sets the address of the basic UCB 201 in the basic UCB address 249 (Step 620), and sets the UCB attribute flag 244 to parallel access (Step 621). The channel unit 113 also finds the rearmost parallel access UCB 203 by tracing the next UCB address 218 from the basic UCB 201, sets the address of the acquired parallel access UCB 204 in the next UCB address 238 of this rearmost parallel access UCB 203, and sets the UCB control flag 2410 inside the acquired parallel access UCB 204 to in-use (Step 606)

In addition, the channel unit 113 determines if there is a vacant parallel access identifier of the CU of the access-targeted logical device by referencing the parallel access control table 2010 (Step 607), and if there is a vacant parallel access identifier, it sets the bit corresponding to the vacant parallel access identifier on the parallel access control table 2010 to "1" (in-use), and secures the parallel access identifier of this space (Step 608), and sets the secured parallel access identifier in the parallel access identifier 243 inside this parallel access UCB 204 (Step 609). In addition, the channel unit 113 searches out a SUBCH identifier from the free SUBCH queue 206 (Step 610), and if it finds a free SUBCH identifier, for example, free SUBCH identifier 263, in the free SUBCH queue 206, it extracts this SUBCH identifier 263 from the free SUBCH queue (Step 611), and sets the acquired SUBCH identifier 263 in the SUBCH identifier 247 inside the parallel access UCB 204 (Step 612).

In addition, the channel unit 113 sets the address of IOQ 207 in the IOQ address 246 inside parallel access UCB 204 (Step 613), and sets the IOSB address 271 inside IOQ 207 (Step 614). In addition, the channel unit 113 sets the channel program address 281, which is inside the IOSB 208, the logical device address 241, which is inside the parallel access UCB 204, and the CU identifier 242, parallel access identifier 243, and available path information 245 in the SUBCH 1131 specified by the SUBCH identifier 247 inside the parallel access UCB 204 (see FIG. 1) (Step 615), and, based on the above-mentioned information set inside the SUBCH 1131, creates a frame 500 (see FIG. 5), which incorporates the parallel access identifier 243 into the device address 522a (Step 616), and sends this frame 500 from the input/output device 1132 to the storage subsystem 102 (Step 623).

Further, when there is no vacant parallel access identifier in Step 607, no SUBCH identifier inside the free SUBCH queue 206 in Step 610, or no free UCB inside the free UCB queue 205 in Step 617, the channel unit 113 waits until this desired resource is open before carrying out processing (Step 624).

Next, the control of access request processing performed by the storage subsystem 102 will be explained first.

Figure 7:
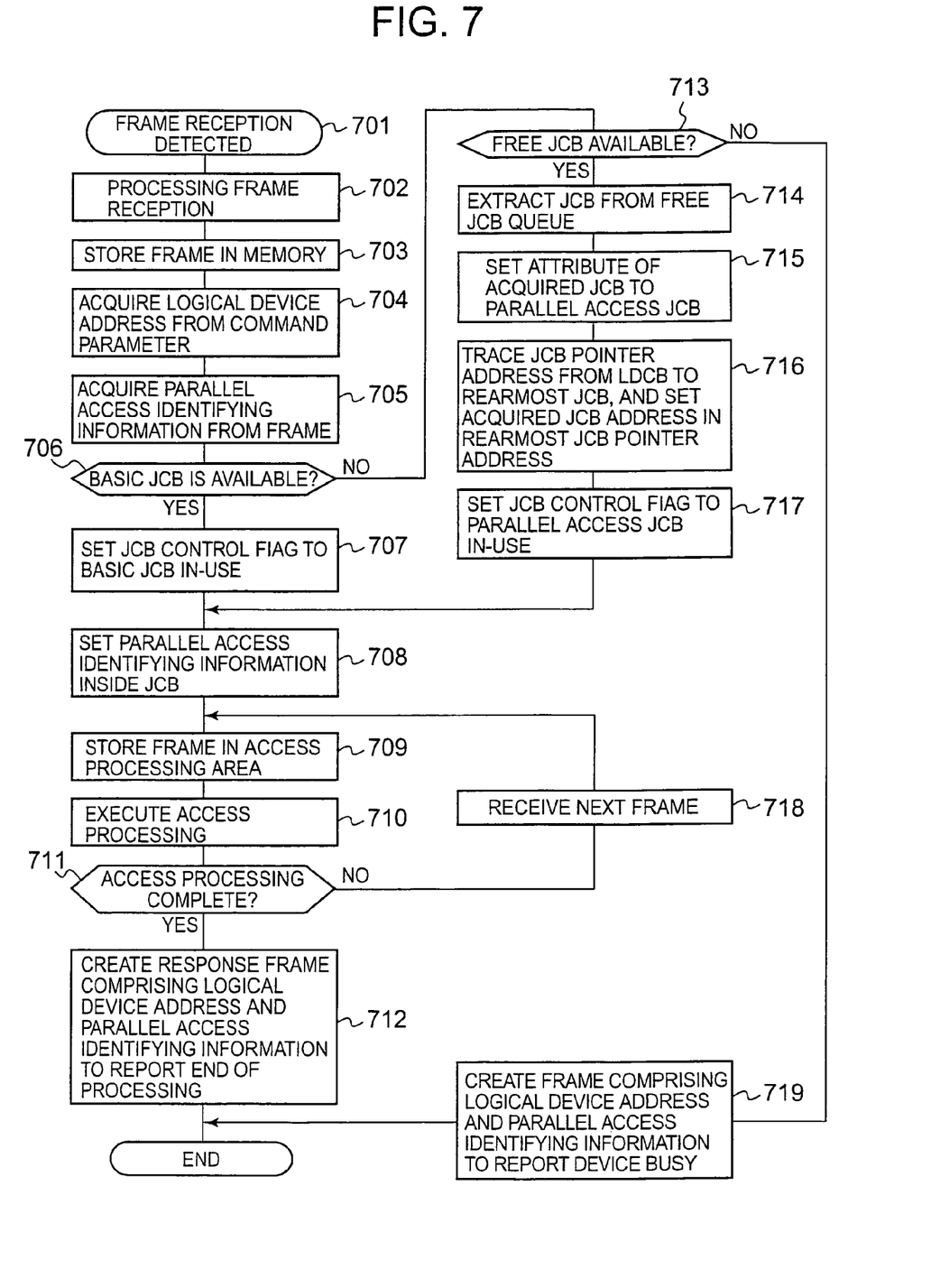
FIG. 7 is a flowchart showing one example of processing from the execution of access processing subsequent to frame reception until the issuance of a termination report to the host processing apparatus, which is executed by a storage subsystem in a data processing system related to the first embodiment of the present invention.

FIG. 7 shows an example of the flow of control, which the storage subsystem 102 executes, for processing an access request from the host processing apparatus 101.

As shown in FIG. 7, when the control processor 122 of the storage subsystem 102 detects the reception of a frame 500 in the input/output control device 121 (Step 701), it receives and stores in the memory 123 the CCW of the prefix command, which has been transmitted in accordance with the received one or successive plurality of frames 500 (see FIG. 5) (Step 702), and stores the received frame in the memory 123 (Step 703). The control processor 122 acquires a logical device address 402-1 from the reserve area 402 in the command parameter 400 (see FIG. 4) of the prefix command stored in the memory 123 (Step 704), and acquires the parallel access identifier 522a-1 from the device address 522a of the frame 500 (see FIG. 5) (Step 704).

Next, the control processor 122 specifies the LDCB 301 (See FIG. 3), which is allocated to the acquired logical device address (for example, logical device address "A"), and determines, based on the JCB control flag 312 inside this LDCB 301, if the basic JCB 303 allocated to the access-targeted logical device is available (whether or not it is being used in any access request process) (Step 706). As a result of this, if the basic JCB 303 is available, the control processor 122 sets the JCB control flag 312 inside the LDCB 301 to basic JCB in-use (Step 707), and sets the parallel access identifier 522a-1 acquired from the received frame 500 in the parallel access identifier 333 inside the JCB 303 (Step 708). In addition, the control processor 122 stores the received frame 500 stored in the memory 123 in the access processing area 334 inside the basic JCB 303 (Step 709), and then executes the access processing requested for the access-targeted logical device in accordance with the CCW (in other words, the access request) carried in by the received frame 500 (Step 710).

Thereafter, the control processor 122 makes a determination as to whether or not the requested access processing is complete (Step 711), and repeats the reception of related follow-on frames 500 (Step 718) and the above-mentioned Steps 709, 710 until there are no more follow-on frames 500 related to the received frame 500. When there are no more related follow-on frames, and the requested access processing is complete, the control processor 122 creates a response frame 500 comprising the logical device address 402-1 and the parallel access identifier 522a-1, and sends it to the host processing apparatus 101 (Step 712). Similar to when the WRITE and READ system commands explained by referring to FIGS. 4 and 5 are sent, in the case of a response frame as well, the parallel access identifier 522a-1 is set in the device address field inside this frame, and the logical device address 402-1 is set inside the command parameter of the response command.

Conversely, when it is determined in Step 706 that a basic JCB 303 is not available, the control processor 122 determines if a free JCB exists inside the free JCB queue 306

(Step 713), and if a free JCB is detected, it extracts the detected free JCB from the free JCB queue 306 for use as a parallel access JCB 304 (Step 714), and sets the JCB attribute flag 342 inside the acquired parallel access JCB 304 to parallel access JCB (Step 715). In addition, the control processor 122 sets the address of the parallel access JCB 304 acquired from the free JCB queue 306 in the next JCB pointer address 331 of the basic JCB 303 (or, if one or more other parallel access JCBs are already associated to the basic JCB 303, in the next JCB pointer address of the rearmost parallel access JCB) (Step 716), sets the JCB control flag 312 inside the LDCB 301 to parallel access JCB in-use (Step 717), and sets the parallel access identifier 522a-1 acquired from the received frame 500 in the parallel access identifier 343 inside the parallel access JCB 304 (Step 708). In addition, the control processor 122 stores the received frame 500 stored in the memory 123 in the access processing area 344 inside the parallel access JCB 304 (Step 709), and then executes the access processing requested for the access-targeted logical device in accordance with the CCW (in other words, the access request) carried in by the received frame 500 (Step 710).

Thereafter, the control processor 122 makes a determination as to whether or not the requested access processing is complete (Step 711), and repeats the reception of related follow-on frames 500 (Step 718) and the above-mentioned Steps 709, 710 until there are no more follow-on frames 500 related to the received frame 500. When there are no more related follow-on frames, and the requested access processing is complete, the control processor 122 creates a response frame 500 comprising the logical device address 402-1 and the parallel access identifier 522a-1, and sends it to the host processing apparatus 101 (Step 712).

Further, when there is no free JCB inside the free JCB queue 306 in Step 713, the control processor 122 creates a device busy report frame comprising the logical device address 402-1 and the parallel access identifier 522a-1, and sends it to the host processing apparatus 101 (Step 719). Similar to when the WRITE and READ system commands explained by referring to FIGS. 4 and 5 are sent, in the case of a device busy report frame as well, the parallel access identifier 522a-1 is set in the device address field inside this frame, and the logical device address 402-1 is set inside the command parameter of the device busy report command.

As explained hereinabove, in a data processing system of this embodiment, when the host processing apparatus 101 generates an access request for a certain logical device inside the storage subsystem 102, it stores the access-targeted logical device address inside the CCW of this access request (for example, inside the command parameter 400 of the prefix command, which precedes the access operation command as shown in the example given in FIG. 4), and, in addition, sets a parallel access identifier 522a-1 for clearly discriminating between this access request and another access request for the same logical device in the device address 522a inside the frame 500 for sending this CCW, and then sends this frame to the storage subsystem 102. The storage subsystem 102, using the parallel access identifier 522a-1 set in the received frame 500, identifies a plurality of access requests for the same logical device, parallelly processes this plurality of access requests by using different JCBs to distinguish between them, and then, when the respective access request processing is complete, reports the termination of processing to the host processing apparatus 101 by returning a response frame 500 comprising the parallel access identifier 522a-1. In accordance therewith, the number of logical device addresses capable of being managed by the data processing system as a whole is not restricted by the structure of the frame 500, making it possible to substantially increase this number. Further, parallel access processing can be carried out independent of the number of logical devices implemented by the storage subsystem 102. Thus, the present invention increases the number of logical device addresses capable of being managed by the data processing system, and also enhances data access processing performance.

Furthermore, in the above-mentioned embodiment, because the parallel access identifier is set-in the least-significant-byte device address 522a of the device address part 522 inside a frame 500, the number of parallel access processes per CU is limited to a maximum of 256, but, for example, the constitution can be such that the setting area of the parallel access identifier can be extended up to the most-significant-byte reserve area 522b of the device address part 522, or the reserve area of the command parameter of the prefix command or some other command can be used for setting the parallel access identifier, making it possible to easily expand the number of parallel access processes.

What is claimed is:

1. A data processing system, which comprises a host processing apparatus, and a storage subsystem which is communicatively connected to said host processing apparatus and which has a plurality of logical devices for storing data, wherein:
    said host processing apparatus has a channel unit for notifying access requests for the respective logical devices to said storage subsystem,
    said storage subsystem has a control processor which controls access processing for the respective logical devices requested by said access request, in response to said access request notified from said host processing apparatus,
    when an access request is generated for a certain logical device, said channel unit of said host processing apparatus creates one or more channel command words corresponding to said access request, sets logical device identifying information for identifying said certain logical device in a first field, which size is configured as larger than a predetermined logical device address data size to accommodate a plurality of logical device address data therein, in at least one of said channel command words, creates one access request frame of a prescribed structure for each of said at least one channel command word, sets said at least one channel command word in a second field within said frame, and then sends said frame to said storage subsystem, and
    said control processor of said storage subsystem receives said frame sent from said host processing apparatus, receives said channel command word from said second field of said received frame, acquires said logical device identifying information from said first field of at least one of said received channel command words, specifies which logical device is to be accessed based on said acquired logical device identifying information, and then controls access processing for said certain logical device in accordance with said received channel command word.

2. The data processing system according to claim 1, wherein:
    when a plurality of access requests are generated for said certain logical device, said channel unit of said host processing apparatus allocates different parallel access identifying information to each of said plurality of access requests, and then sets said different parallel access identifying information allocated to each of said plurality of access requests, in a third field of said frame for each access request and sends said frame to said storage subsystem, and said control processor of said storage subsystem acquires said parallel access identifying information from said third field of said received frame, and identifies each of said plurality of access requests for the same logical device in accordance with said acquired parallel access identifying information.

3. The data processing system according to claim 2, wherein:

the size of said first field in said channel command word is larger than the size of said third field in said frame.

4. The data processing system according to claim 2, wherein:

said control processor of said storage subsystem creates a response frame of a prescribed structure for responding to said access request from said host processing apparatus, sets parallel access identifying information allocated to each of said access requests, and logical device identifying information of said certain logical device in said response frame, and then returns said response frame to said host processing apparatus.

5. The data processing system according to claim 2, wherein:

said host processing apparatus further comprises a number of control blocks to be allocated to processing operations of different access requests, and when a plurality of access requests is generated for said certain logical device, said channel unit of said host processing apparatus allocates different control blocks to said plurality of access requests, and then parallelly controls the processing operations of said plurality of access requests using said different control blocks and said different parallel access identifying information allocated to each of said plurality of access requests.

6. The data processing system according to claim 2, wherein:

said channel unit of said host processing apparatus has a plurality of subchannels for respectively storing control information, each of which is used to create said frame for each of the respective access requests, and identifies, from among said plurality of subchannels, a free subchannel which is currently not being used, and when each access request is generated, dynamically allocates the respective free subchannels to said respective access requests.

7. The data processing system according to claim 2, wherein:

said storage subsystem generates, on the basis of a combination of said logical device identifying information acquired from said received channel command word and said parallel access identifying information acquired from said received frame, a plurality of access control blocks respectively allocated to a plurality of access processes for the same logical device, and parallelly controls said plurality of access processes using said plurality of access control blocks.

8. The data processing system according to claim 2, wherein said logical device identifying information is an address of said certain logical device.

9. The data processing system according to claim 2, wherein said third field is configured to be in a least-significant-byte reserve area of a device address part inside the frame, and in a most-significant-byte reserve area of the device address part or a reserve area for the channel command words.

10. A host processing apparatus in a data processing system including a storage subsystem which is communicatively connected to said host processing apparatus and which has a plurality of logical devices for storing data, wherein said host processing apparatus has a channel unit for notifying access requests for the respective logical devices to said storage subsystem, when an access request is generated for a certain logical device, said channel unit of said host processing apparatus creates one or more channel command words corresponding to said access request, sets logical device identifying information for identifying said certain logical device in a first field, which size is configured as larger than a predetermined logical device address data size to accommodate a plurality of logical device address data therein, in at least one of said channel command words, creates one access request frame of a prescribed structure for each of said at least one channel command word, sets said at least one channel command word in a second field within said frame, and then sends said frame to said storage subsystem.

11. A storage subsystem in a data processing system including a host processing apparatus communicatively connected to said storage subsystem, comprising a plurality of logical devices for storing data, wherein when an access request is generated for a certain logical device, said host processing apparatus creates one or more channel command words corresponding to said access request, sets logical device identifying information for identifying said certain logical device in a first field, which size is configured as larger than a predetermined logical device address data size to accommodate a plurality of logical device address data therein, in at least one of said channel command words, creates one access request frame of a prescribed structure for each of said at least one channel command word, sets said at least one channel command word in a second field within said frame, and then sends said frame to said storage subsystem, said storage subsystem has a control processor which controls access processing for the respective logical devices requested by said access request, in response to said access request notified from said host processing apparatus, said control processor of said storage subsystem receives said frame sent from said host processing apparatus, receives said channel command word from said second field of said received frame, aquires said logical device identifying information from said first field of at least one of said received channel command words, specifies which logical device is to be accessed based on said aquired logical device identifying information, and then controls access processing for said certain logical device in accordance with said received channel command word.

* * * * *